United States Patent
Früh et al.

(10) Patent No.: US 6,750,275 B2
(45) Date of Patent: Jun. 15, 2004

(54) VULCANIZABLE RUBBER MIXES

(75) Inventors: Thomas Früh, Ludwigshafen (DE);
Ludger Heiliger, Neustadt (DE);
Thomas Kleiner, Odenthal (DE);
Hermann-Josef Weidenhaupt, Pulheim (DE); Robert-Hans Schuster, Hannover (DE); Joachim Kiesekamp, Halle/Saale (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 317 days.

(21) Appl. No.: 09/764,672

(22) Filed: Jan. 18, 2001

(65) Prior Publication Data

US 2001/0012866 A1 Aug. 9, 2001

(30) Foreign Application Priority Data

Jan. 28, 2000 (DE) .......................... 100 03 742

(51) Int. Cl.$^7$ ................................ C08K 5/46
(52) U.S. Cl. ...................... 524/83; 524/122
(58) Field of Search ................... 524/83, 122

(56) References Cited

FOREIGN PATENT DOCUMENTS

| EP | 767205 | 4/1997 |
|----|--------|--------|
| EP | 945482 | 9/1999 |
| GB | 1342889 | 1/1974 |

OTHER PUBLICATIONS

Rubber Products Manufacturing Tech., (month unavailable), 1994, pp. 1–102, A. D. Thorn et al, "Compound Design".
Rubber Products Manufacturing Tech., (month unavailable), 1994, pp. 315–396, Bhowmick et al, "Vulcanization and Curing Techniques".

*Primary Examiner*—Peter D. Mulcahy
(74) *Attorney, Agent, or Firm*—Joseph C. Gil; Jennifer R. Seng

(57) ABSTRACT

The present invention relates to vulcanizable rubber mixes which, apart from the rubbers, contain O,O-bis-(alkyl)-dithiophosphoric acid polysulfides and primary and/or secondary amines, which are characterized in that they may be vulcanized without release of nitrosamines with a high crosslink density and a high proportion of short sulfur bridges.

7 Claims, 2 Drawing Sheets

VULCANIZABLE RUBBER MIXES

FIELD OF THE INVENTION

The present invention relates to vulcanizable rubber mixes which may be vulcanized without the release of nitrosamines with a high crosslink density and a high proportion of short sulfur bridges.

BACKGROUND OF THE INVENTION

It is known from the prior art to prepare rubber vulcanizates with a high degree of crosslinking by vulcanizing the corresponding rubbers in the presence of sulfur in combination with known vulcanization accelerators such as sulfenamides, thiurams or carbamates. A disadvantage of using such vulcanization systems, however, is that relatively large amounts of crosslinking chemicals are required to obtain a high crosslink density in the vulcanizates. Another disadvantage is that the proportion of long-chain sulfur bridges in the vulcanizate is relatively high, which means that the heat resistance of the vulcanizates is unsatisfactory. We refer in this connection, e.g., to M. R. Kreijsa, J. L. Koenig, "The Nature of Sulfur Vulcanization" in Elastomer Technology Handbook, ed, by N. P. Cheremisinoff, p. 475 ff, CRC Press Inc., Boca Raton 1993; A. D. Thorn, R. A. Robinson, "Compound Design" in Rubber Products Manufacturing Technology, ed., by A. K. Bhowmick, M. M. Hall, H. A. Benarey, p 1 ff, Marcel Dekker Inc., New York 1994, and A. K. Bhowmick, D. Mangaraj, "Vulcanization and Curing Techniques" in Rubber Products Manufacturing Technology, ed., by A. K. Bhowmick, M. M. Hall, H. A. Benarey, p. 315 ff, Marcel Dekker Inc., New York 1994.

SUMMARY OF THE INVENTION

An object of the present invention is to provide vulcanizable rubber mixes which produce vulcanizates which have a high crosslink density and a high proportion of short-chain sulfur bridges. Moreover, the aim of the present invention is to execute vulcanization with vulcanization chemicals which do not release nitrosamines and are therefore ecologically acceptable. Moreover, the aim of the present invention was to obtain a high crosslink density of the vulcanizates with the lowest possible molar additions of crosslinking chemicals.

The present invention provides, therefore, vulcanizable rubber mixes containing a) rubbers, b) O,O-bis-(alkyl)dithiophosphoric acid polysulfides corresponding to the formula

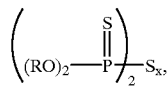

wherein
x represents 2, 3, 4 or 5 and
R represents a $C_8$–$C_{12}$-alkyl or -cycloalkyl radical
and c) primary and/or secondary amines corresponding to the formula

wherein
Y represents hydrogen or a mercaptobenzothiazole radical,
$R_1$ represents hydrogen, $C_1$–$C_6$-alkyl, $C_5$ or $C_6$-cycloalkyl or $C_7$–$C_{12}$-aralkyl and
$R_2$ has the same meaning as $R_1$,
with the proviso that $R_1$ and $R_2$ do not simultaneously represent hydrogen, wherein the components b) and c) are present in a molar ratio of from (0.5 to 1.5):1 and in a total amount of from 1.0 to 10 parts by wt. per 100 parts by wt. of rubbers in the rubber mixes.

DETAILED DESCRIPTION OF THE INVENTION

Figure 1:
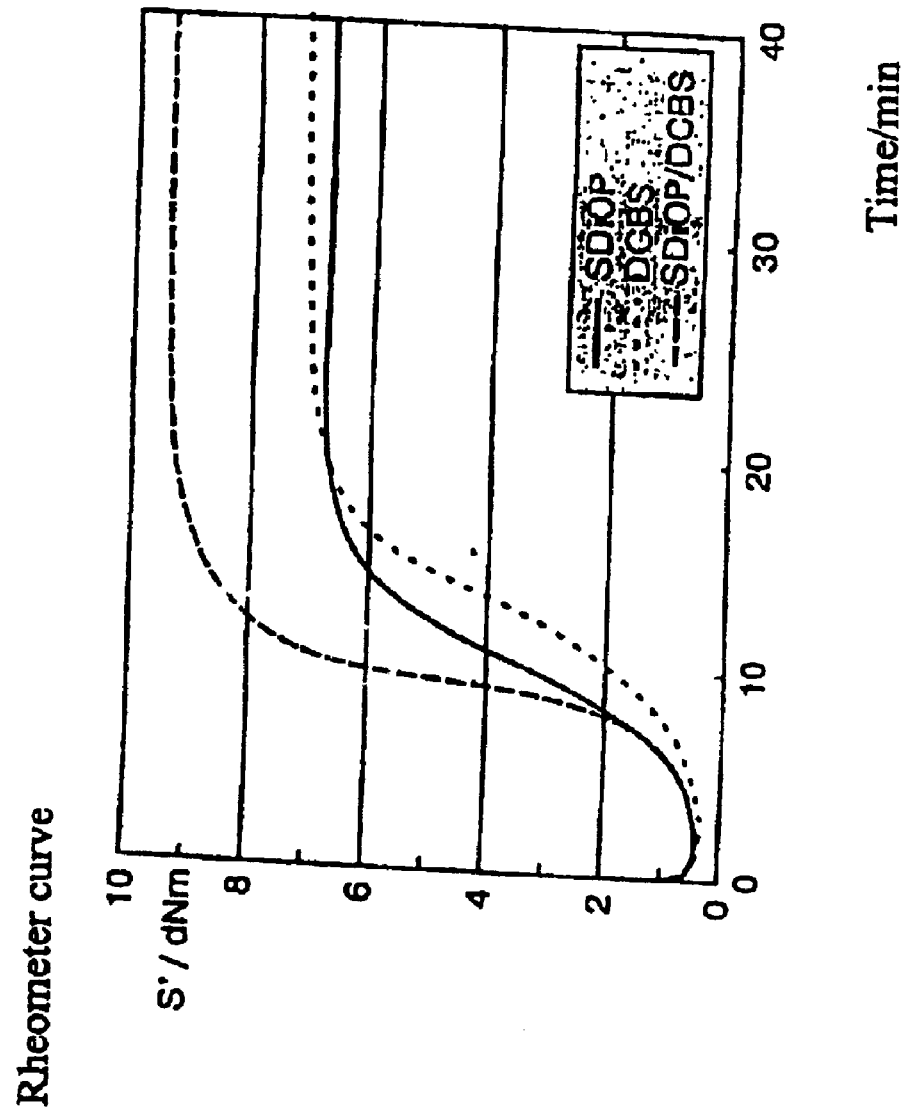
FIG. 1 shows a graph of Rheometer experiments of the vulcanization accelerators individually and in combination at 150° C.

A molar ratio of the components b) and c) from (0.9 to 1.1):1 is preferred, and a total amount of from 1.0 to 7 parts by wt. per 100 parts by wt. of rubbers in the rubber mixes.

The rubbers a) which may be used according to the present invention may contain double bonds corresponding to iodine values of at least 2, preferably 5 to 470. The iodine values are generally determined by the Wijs method (DIN 53241, part 1) after addition of iodine chloride to acetic acid. The iodine value defines the amount of iodine in g which is chemically bound by 100 g of substance.

The rubbers generally have Mooney viscosities ML 1–4/100° C. (DIN 53523) of 10–150, preferably 20–120.

Rubbers used may be both natural rubber and synthetic rubbers. Preferred synthetic rubbers are described, for example, in I. Franta (Elastomers and Rubber Compounding Materials, Elsevier, N.Y. 1989) or in Ullmanns Encyclopaedia of Industrial Chemistry volume A 23, VCH Verlag, Weinheim 1993.

They include, i.a.

| | |
|---|---|
| BR = | polybutadiene |
| ABR = | butadiene/acrylic acid $C_1$—$C_4$-alkyl ester copolymers, |
| IR = | polyisoprene, |
| NR = | natural rubber, |
| SBR = | styrene-butadiene copolymers with styrene contents of 1–60, preferably 2–50 wt. %, |
| XSBR = | Styrene-butadiene copolymers and graft polymers with other unsaturated polar monomers such as acrylic acid, methacrylic acid, acrylamide, methacrylamide, N-methoxymethyl methacrylic acid amide, N-acetoxymethyl methacrylic acid amide, acrylonitrile, hydroxyethylacrylate and/or hydroxyethylmethacrylate with styrene contents of 2–50 wt. % and containing 1–20 wt. % of polar monomers polymerized into the molecule, |

| | -continued |
|---|---|
| IIR = | Isobutylene/isoprene copolymers with isoprene contents of 0.5–10 wt. %, |
| BRIIR- = brominated | Isobutylene/isoprene copolymers with bromine contents of 0.1–10 wt. %, |
| CL/IIR = | Chlorinated isobutylene/isoprene copolymers with bromine contents of 0.1–10 wt. %, |
| NBR = | Polybutadiene-acrylonitrile copolymers with acrylonitrile contents of 5–60, preferably 10–50 wt. %, |
| HNBR = | Partially hydrogenated NBR rubber in which up to 98.5% of the double bonds are hydrogenated, |
| XHNBR = | Fully hydrogenated NBR rubber in which up to 100% of the double bonds are hydrogenated, |
| EPDM = | Ethylene-propylene-diene copolymers, |
| FKM = | Fluororubber, |
| CR = | Chloroprene rubbers, |
| CM = | Chlorinated polyethylene, |
| CSM = | Chlorosulfonated polyethylene, |
| ACSM = | Chlorosulfonated polyethylene/polypropylene, |
| ECO = | Epichlorohydrin rubber, |
| ACM = | Acrylic rubber, |
| EAM = | Vamac ® = copolymers of ethylene, methyl acrylate and a third carboxyl group-containing component (DuPont), |
| ECO = | Epichlorohydrin rubber, |
| Q = | Silicone rubbers, |
| AU = | Polyester urethane polymers, |
| EU = | Polyether urethane polymers, | and mixtures of said rubbers.

Substances used as component b) in the rubber compounds according to the present invention are, in particular, those in which x represents the numbers 3, 4 or 5 and R represents an alkyl or cycloalkyl radical with 8 carbon atoms. More preferably, component b) used is O,O-bis(2-ethylhexyl)dithiophosphoric acid polysulfide corresponding to the formula below:

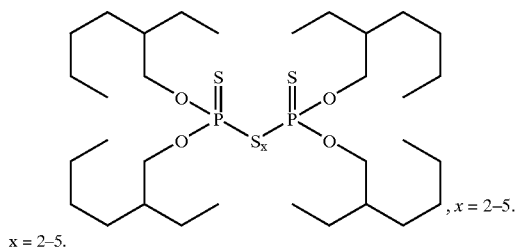

x = 2–5.

Primary and secondary amines used are preferably those corresponding to the above mentioned formula (component c) in which Y represents hydrogen or a mercaptobenzothiazolyl radical and $R_1$ and $R_2$ have the meaning of $C_5$- or $C_6$-cycloalkyl. More preferably, primary and/or secondary amines used are cyclohexylamine, dicyclohexylamine, CBS (N-cyclohexyl-2-benzothiazole sulfenamide), TBBS (N-tert.-butyl-2-benzothiazole sulfenamide) and DCBS (N,N,-dicyclohexyl-2-benzothiazole sulfenamide).

Of course, it is possible to use the components a), b) and c) both individually and as a mixture thereof in the rubber compounds according to the present invention. In order to determine the most favorable mixing ratio, appropriate preliminary tests may be carried out, the mixing ratio depending in particular on the later intended use of the rubber vulcanizates.

The vulcanizable rubber compounds according to the present invention are usually prepared by mixing the corresponding rubbers with the components b) and c) described above in the given amounts in suitable mixing apparatus such as internal mixers, rolls or extruders.

In order to prepare corresponding vulcanizates, the rubber compounds according to the invention are vulcanized in the usual way in the presence of crosslinking agents (vulcanizing agents) such as sulfur. The amount of crosslinking agents such as sulfur which is added to the rubber compounds to be vulcanized is about 0.1 to 6, preferably 0.5 to 3.0 wt. %, based on the rubber.

Of course, further rubber chemicals of the kind mentioned or rubber auxiliaries may be added to the rubber mixes according to the present invention, as described, for example, in Khairi Nagdi: "Gummiwerkstoffe", A manual for users, Vogel-Verlag, Würzburg 1981. These additives are added in the known amounts and depend on the intended use of the rubber vulcanizates in each case.

The present invention also provides the use of the rubber mixes according to the invention for the manufacture of rubber molded parts of all kinds, particularly for the manufacture of tires, hoses, damping components, seals and profiles.

It is surprising that, with the rubber mixes according to the present invention described above, it is possible to prepare rubber vulcanizates which have a high crosslink density combined with a high proportion of short-chain sulfur bridges, and to keep the molar amount of vulcanizing agents (crosslinking agents) low compared with the prior art.

EXAMPLES

The NR-based test mixes examined (Crepe 1) are unfilled and contain no plasticizers or antioxidants:

TABLE 1

| Component of mix | Amount (phr) |
|---|---|
| NR (Crepe 1) | 100 |
| ZnO | 2.5 |
| Stearic acid | 1.0 |
| Sulfur | 1.7 |
| Accelerator | Molar amount of sulfur in accelerator chemicals / Molar amount of elemental sulfur = 0.18 |

For the O,O-bis(alkyl)dithiophosphoric acid polysulfide, the amount of free sulfur was reduced to 1.4 phr in order to adjust the total sulfur concentration to 1.7 phr according to the formulation, compared with the other accelerators. For reasons of clarity, the name O,O-bis(alkyl)-dithiophosphoric acid polysulfide is replaced in the Examples by SDiOP. For the same reasons, cyclohexylamine is abbreviated to CHA and dicyclohexylamine to DCHA.

Example 1

Rheometer experiments on the vulcanization accelerators individually and in combination at 150° C. (See FIG. 1).

Rheometer Behavior

TABLE 2

| Accelerator | $S''_{max}-S''_{min}$ [dNm] |
|---|---|
| SdiOP | 6.4 |
| DCBS | 6.9 |
| SDiOP + DCBS | 9.0 |

Kinetics

TABLE 3

| Accelerator | $t_i$ [min] | $K_i$ [min$^{-1}$] | $E_a$ [kJ/mole] |
|---|---|---|---|
| SDiOP | 7.0 | 0.22 | 107 |
| DCBS | 9.4 | 0.25 | 93 |
| SDiOP + DCBS | 8.3 | 0.68 | 91 |

The rheometer behavior (rheometer curves, rheometer data and kinetics) is determined in accordance with DIN 53529. The apparatus used is an RPA 2000 from Apha Technologies. The kinetic data $k_i$, $t_i$ are obtained from a first-order formal kinetic evaluation in the interval $t_{25}$ to $t_{65}$. Ea is obtained from regression by way of the k values at 130, 140, 150, 160 and 170° C.

It follows from the tables that the combination according to the invention has a markedly increased torque difference ($S'_{max} - S'_{min}$), that the activation energy $E_a$ was reduced simultaneously and the reaction rate constants were reduced whilst the induction time lies between the two individual components.

Example 2

Determination of the crosslinking efficiency and crosslink density of the vulcanization accelerators individually and in combination at 150° C.

Crosslink Structure, Crosslink Density

TABLE 4

| Accelerator | $S_1$ [%] | $S_2$ [%] | $S_x$ [%] | Efficiency $\delta ve/\delta c$ (S) | Density ve.10$^5$/mole cm$^{-3}$ |
|---|---|---|---|---|---|
| SDiOP | 64 | 24 | 12 | 0.21 | 11.5 |
| DCBS | 0 | 40 | 60 | 0.28 | 12.6 |
| SDiOP + DCBS | 72 | 15 | 13 | 0.32 | 17.5 |

The crosslink density is determined according to P. J. Flory, J. Rehner, jr., J. Chem. Soc. 521 (1943). The crosslink structure is determined according to B. Saville, A. A. Watson, Rubber Chem. Technol. 100 (1967). $S_1$=monosulfide linkage, $S_2$=disulfide linkage, $S_x$=polysulfide linkage.

It follows from the values that the crosslinking efficiency $\delta ve/\delta c$ is surprisingly high and at the same time the proportion of short/monosulfide sulfur bridges is very high. In addition, the crosslink density that can be achieved in the chemical combination according to the invention is disproportionately high.

Example 3

Figure 2:
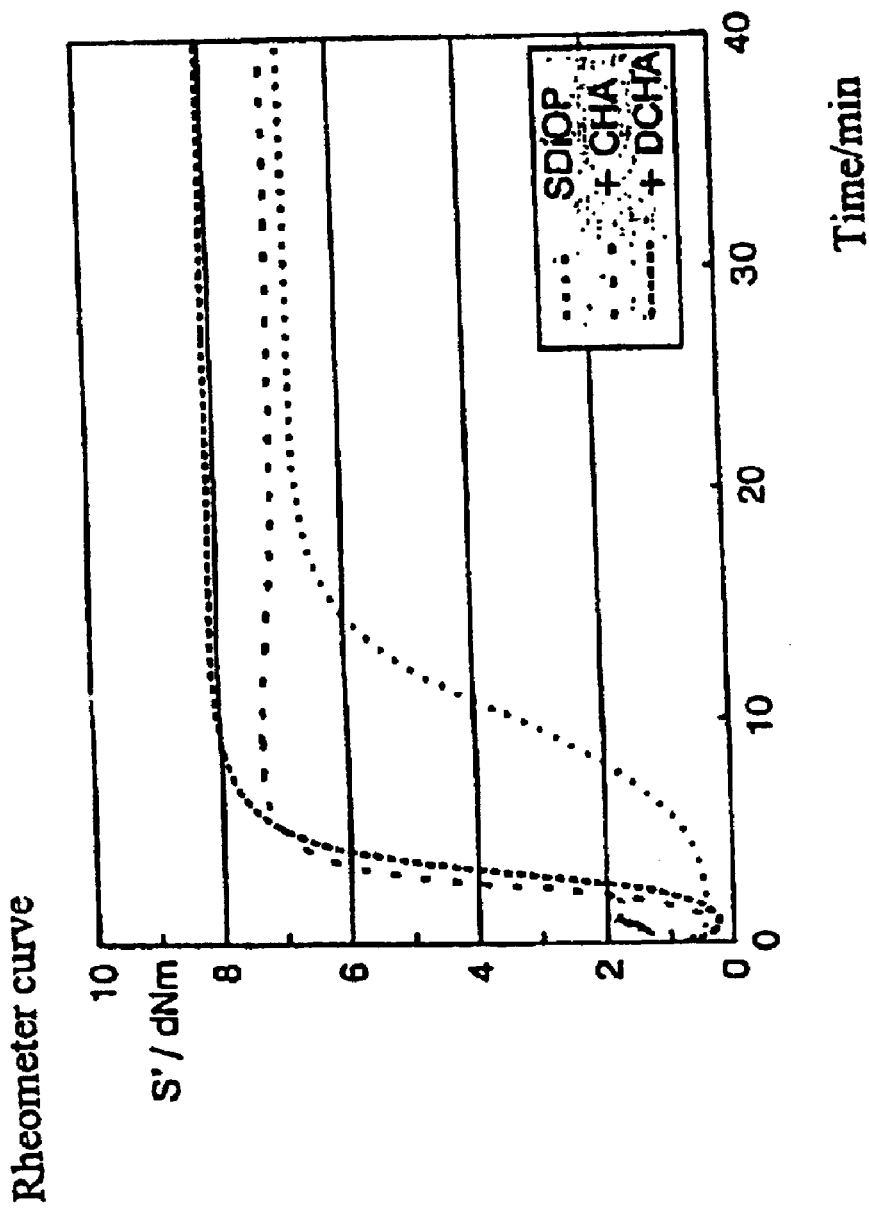
FIG. 2 shows a graph of Rheometer experiments on the SdiOP individually and in combination with equimolar amounts of CHA and DCHA at 150° C.

Rheometer experiments on the SDiOP individually and in combination with equimolar amounts of CHA and DCHA at 150° C. (See FIG. 2).

Rheometer Behavior

TABLE 5

| Accelerator | S"$_{max}$ – S"$_{min}$ [dNm] |
|---|---|
| SdiOP | 6.4 |
| SDiOP + CHA | 7.0 |
| SDiOP + DCHA | 7.8 |

Kinetics

TABLE 6

| Accelerator | $t_i$ [min] | $K_i$ [min$^{-1}$] | $E_a$ [kJ/mole] |
|---|---|---|---|
| SdiOP | 7.0 | 0.22 | 107 |
| SDiOP + CHA | 2.0 | 0.86 | 98 |
| SDiOP + DCHA | 2.2 | 0.57 | 115 |

It follows from the values in the tables that a surprising activation of the crosslinking reaction is obtained by the use of the amines according to the invention. This is evident from the greater torque difference $S\infty_{max} - S'_{min}$, the shorter induction times $t_i$ and the very greatly increased reaction rate constants $k_i$.

Example 4

Determination of the crosslink density of SDiOP individually and in combination with equimolar amounts of CHA and DCHA at 150° C.

Crosslink Structure, Crosslink Density

TABLE 7

| Accelerator | $S_1$ [%] | $S_2$ [%] | $S_x$ [%] | Density ve.10$^5$/mole cm$^{-3}$ |
|---|---|---|---|---|
| SDiOP | 68 | 21 | 11 | 12 |
| SDiOP + CHA | 48 | 21 | 31 | 13 |
| SDiOP + DCHA | 73 | 16 | 11 | 16.3 |

It follows from the values in the tables that the total crosslink density as a whole is increased and that, in particular, the proportion of monosulfide crosslinks is very greatly increased when SDiOP is used in combination with DCHA.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Vulcanizable rubber mixes comprising:
   a) rubbers,
   b) O,O-bis-(alkyl)dithiophosphoric acid polysulfides corresponding to the formula

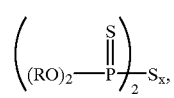

wherein
   x represents 2, 3, 4 or 5 and
   R represents a $C_8$–$C_{12}$-alkyl or -cycloalkyl radical and
   c) primary and/or secondary amines corresponding to the formula

wherein

Y represents hydrogen or a mercaptobenzothiazole radical,

R$_1$ represents hydrogen, C$_1$–C$_6$-alkyl C$_5$ or C$_6$-cycloalkyl C$_7$–C$_{12}$-aralkyl and R$_2$ has the same meaning of R$_1$, with the proviso that R$_1$ and R$_2$ do not simultaneously, represent hydrogen, wherein the components b) and c) are in a molar ratio from (0.5 to 1.5):1 and are present in a total amount of from 1 to 10 parts by wt. per 100 parts by wt. of rubbers in the rubber mixes, and d) 0.5 to 3.0 wt.-% sulfur, based on the rubber.

2. Rubber molded products comprising vulcanizable rubber mixes comprising:
a) rubbers,
b) O,O-bis-(alkyl)dithiophosphoric acid polysulfides corresponding to the formula

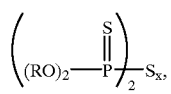

wherein
x represents 2, 3, 4 or 5 and
R represents a C$_8$–C$_{12}$-alkyl or -cycloalkyl radical
c) primary and/or secondary amines corresponding to the formula

wherein
Y represents hydrogen or a mercaptobenzothiazole radical,
R$_1$ represents hydrogen, C$_{1-6}$ -alkyl, C$_5$ or C$_6$-cycloalkyl, C$_{7-C12}$-aralkyl and
R$_2$ has the same meaning of R$_1$, with the proviso that R$_1$ and R$_2$ do not simultaneously represents hydrogen,
wherein the components b) and c) are in a molar ratio from (0.5 to 1.5):1 and are present in a total amount of from 1 to 10 parts by wt. per 10 parts by wt. of rubbers in the rubber mixes, and
d) 0.8 to 3.0 wt.-% sulfur, based on the rubber.

3. A rubber molded product according to claim 2, wherein said rubber molded product is selected from the group consisting of tires, hoses, damping components, seals and profiles.

4. A process for preparing vulcanizable rubber mixes according to claim 1 which may be vulcanized with a high crosslink density and a high proportion of short sulfur bridges, which process comprises mixing the rubbers a) with the components b), c) and d).

5. A process for increasing the crosslink density and the proportion of monosulfide sulfur bridges in the vulcanization of a rubber mix comprising a) rubbers and d) 0.5 to 3.0 wt.% sulfur, based on the rubber, by using a combination of b) O,O-bis-(alkyl)dithiophosphoric acid polysulfides corresponding to the formula

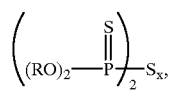

wherein
x represents 2, 3, 4 or 5 and
R represents a C$_8$–C$_{12}$alkyl or -cycloalkyl radical
and c) primary and/or secondary amines corresponding to the formula

wherein
Y represents hydrogen or a mercoptobenzothlazoie radical,
R$_1$ represents hydrogen, C$_1$–C$_6$-alkyl, C$_5$ or C$_6$-cyclosikyl C$_7$–C$_{12}$- aralkyl and
R$_2$ has the same meaning of R$_1$, with the proviso that R1 and R2 do not simultaneously represent hydrogen, wherein the components b) and c) are in a molar ratio from (0.5 to 1.5): 1 and are present in a total amount of from 1 to 10 parts by wt. per 100 parts by wt. of rubbers in the rubber mixes.

6. Vulcanizable rubber mixes according to claim 1, wherein component c) is selected from the group consisting of cyclohexylamine, dicyclohexylamine, and N,N,-dicyclohexyl-2-benzothiazole sulfenamide.

7. Vulcanizable rubber mixes according to claim 1, wherein component b) is a compound of the formula

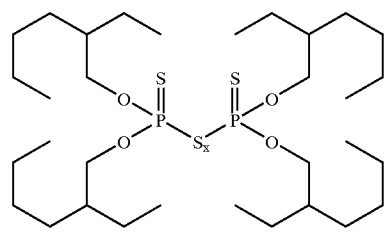

wherein x is 2–5.

* * * * *